INVENTORS:
JAMES A. DOWNS,
STANLEY T. SCHELLENBACH,
BY Kingsland, Rogers, Ezell, Eilers & Robbins
ATTORNEYS

United States Patent Office 3,518,211
Patented June 30, 1970

---

3,518,211
R.T.V. POLYSULFIDE SEALANTS
James A. Downs, Collinsville, Ill., and Stanley T. Schellenbach, Des Peres, Mo., assignors, by mesne assignments, to Thiokol Chemical Corporation, a corporation of Delaware
Continuation of abandoned application Ser. No. 126,811, July 21, 1961. This application July 27, 1965, Ser. No. 475,224
Int. Cl. C08g *43/00*
U.S. Cl. 260—18
2 Claims

ABSTRACT OF THE DISCLOSURE

Sealant compositions cureable at room temperature in the presence of atmospheric moisture are produced by admixing (1) a thiol terminated liquid polysulfide resin, (2) a mixture of barium oxide and barium peroxide; and (3) a cure accelerator which is a lanthaide metal salt of an organic acid. The moisture can be directly admixed if desired.

---

Figure 1:
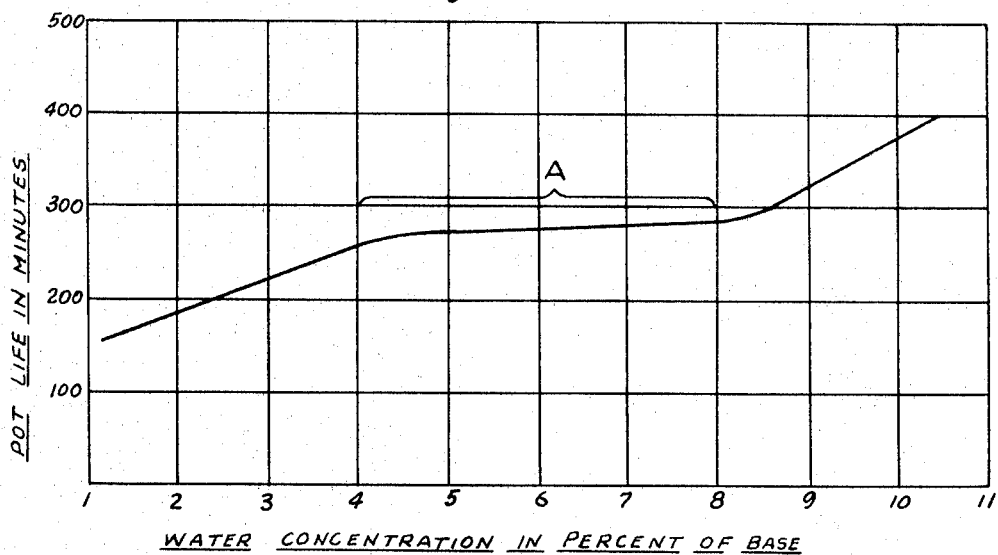

This invention relates to improvements in a composition and method for curing polyfunctional polyuslfides and in particular is concerned with a bivalent alkaline earth metal peroxide curing mechanism. This application is a continuation of application Ser. No. 126,811, filed July 21, 1961, now abandoned.

By means of this invention there has been devised a method and composition for use in curing polyfunctional polysulfides under ambient conditions in one to eight hours, with it being understood that this time can be either shortened or lengthened as will be more fully described below. Essentially, this invention contemplates curing polyfunctional polysulfides having thiol or mercapto terminated groups by the use of a bivalent metal peroxide and particularly barium peroxide in an alkaline medium with 1% to 14% water based on the weight of the polysulfide. It is a particular feature that with the use of the barium peroxide a white product is obtained, which actually becomes whiter upon aging and any further oxidation accompanying such aging. By the use of pigments, a wide range of pleasing pastel colors are obtainable.

In this invention, and as a particular consequence thereof, the method contemplates using two separate components or packages, which can be stored for a long shelf life under stable conditions. In the first or polysulfide base components, the polyfunctional polysulfide is used together with 1% to 14% water, and, more favorably, 5% to 10% which represents considerably more than a trace amount of moisture. An alkali may also be incorporated in the first component or in the second component, as well as plasticizers, buffering agents, and driers, and organic acids used as a pH control agent. In the second or peroxide activator component the bivalent metal peroxide is incorporated which is in a finely divided state, such that it passes a 325 mesh screen. Also desirably incorporated in the second component may be an epoxy resin and a plasticizer which can be used as an adhesive additive and also as a carrier for the finely divided peroxide. It has also been found desirable to incorporate finely divided pyrogenic colloidal silica as a suspending agent for the barium peroxide. The two components may be stored for long periods of time prior to actual use and have a very stable shelf life. Upon use, mixing of the two components is accomplished and curing can take place under ambient conditions so that the process may be carried out very simply without rigorous controls or equipment by relatively unskilled workmen.

The above features are objects of this invention and further objects will appear in the detailed description which follows and will be otherwise apparent to those skilled in the art.

The polysulfide polymers as used herein are synthetic rubber like materials of the type referred to in United States Pats. Nos. 1,890,191; 2,049,974; 2,100,351; 2,195,-380; 2,216,044; 2,466,963; 2,474,859; and 2,787,608. These various polysulfide synthetic polymers are produced in the form of liquids, solids and dispersions, and are sometimes referred to as polyfunctional mercaptans and which have thiol, i.e., SH, terminated groups. It is well known that polysulfide synthetic polymers, useful as base ingredients in carrying out the invention, may be made by reacting polyfunctional organic compounds with alkali metal polysulfides, where the functionality is due to the presence of two or more constituents, put off by reaction with said polysulfide: Chlorine is a typical commercial representative of such functional substituents. The polymers may also be made by the reaction of polythiol bodies with an agent which supplies oxygen or sulphur in active form, and causes polymer formation by the removal of hydrogen and its conversion into water or hydrogen sulfide.

The particular polysulfide polymers with which this invention has to do are a liquid type of poly-mercaptan which may be represented by the general type formula:

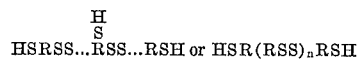

These polymers are composed essentially of the unit RSS; the molecular weight will vary with the number of these units and the polymeric molecule, and also with a specified structure of organic radical "R" in the said molecule. The actual structure of the various polysulfide polymers of which there may be many, may differ widely with differences in the specific structure of the radical "R" but all of these polymers are characterized by poly-functionality in terms of SH, (mercapto or thiol groups). The significant functional groups are SH groups, whatever the nature of the connecting organic radical R, and whether this be a single radical such as ethylene or a formal radical such as dichlorodiethyl formal or a mixture of such radicals.

For convenience in describing these polymeric bodies the connecting organic radical "R" appearing in the above illustrative generalized formula may be defined as any polyvalent organic radical containing at least the grouping $CH_2$ which results from the splitting off of at least two carbon attached negative substituents from an organic compound initially containing two such substituents capable of being split off when the said compound is reacted with an alkali metal polysulfide. Commercially important polysulfide polymers (some of which are distributed under the registered trademark of Thiokol) are derived from various polyfunctional organic halides and frequently from mixtures of such halides reacted with an alkali metal polysulfide and thereafter treated in particular manner as described in the earlier of the patents cited above, and others. The polysulfide polymers, which may be cured to a synthetic rubber or vulcanized with great advantage by the materials and methods of the present invention, may vary in form from thin syrupy liquids to thick viscous liquids to solids. Their molecular weight may vary from about 200 to 30,000 or higher. Normally, liquid polymers are preferred for use in the present invention, such liquid polymers having an average molecular weight of from about 500 to 20,000 or higher, as determined in the familiar manner by means of end group titration. Liquid polymers in this range are viscous liquids at ordinary temperatures having the consistency of thin syrup or molasses and a viscosity of between 250 and 150,000 centipoises.

It is to be understood that commercially produced polyfunctional liquid mercaptans (here embraced by the term liquid polymers) are not pure substances. A product having an average molecular weight of say 4,000 may contain a large proportion on the order of 40 to 60% of polymers of 3,000 to 5,000 molecular weight, but will also contain material quantities of smaller and larger polymers including those having a molecular weight of 500 or even less, and those having molecular weights of 8,000 and more. The commercially available liquid polymers are therefore heterogeneous, and a cured body made therefrom may be similarly heterogeneous.

The present invention contemplates the use of commercially available polysulfide polymers, containing a heterogeneous mixture of polymers differing in molecular weight and their treatment with a novel curing system which cause a rapid cure and effectively links lower molecular weight polymers, and also higher molecular weight polymers. By such action, the heterogeneous character is lowered in the cured, body, and exhibits great stability indicating a homogeneous cure of the majority of the component polymers.

The novel mode of operation and desirable result has been obtained in accordance with the present invention by the use of bivalent metal peroxide curing agents which conform to many other necessary requirements. The present invention is carried out by curing agents which not only act in the manner herein stated above, but which perform the cure at normal atmospheric temperatures, and normal and excessive relative humidity even to the extend of curing under water, without appreciable exothermic reaction, can cure in a void without need of outside air at a rate sufficiently slow to permit a batch of composition to have a reasonably long application life, (that is, period of time after mixing, during which the batch can be extruded, cast, molded, or otherwise applied in use) without causing appreciable curing shrinkage, or undue expansion, and without impairing other physical properties. Moreover, the curing agents here contemplated are compatible with the presence of fillers, retarders, adhesive additives, and other components of a batch.

The preferred curing agents found to have the unexpected properties hereinabove noted as well as other advantages comprised the group of peroxides of limited solubility in tap water of the representative empirical formula $MO_2$, where M is any bivalent alkaline earth cation. Primarily this invention is concerned with barium peroxide, i.e., $BaO_2$ which is of special advantage because of its reaction rate, stability and color brightness advantages. Other alkaline earth peroxides of magnesium, strontium and calcium may be employed if the special advantages of the barium peroxide are not desired. The reaction depends upon the release of oxygen by the reaction with water or other polar compound with the barium peroxide. This can be accomplished with water, or certain polar solvents. The concentration of water must be above trace amounts and has a definite range between 1% and 17.5% based on the weight of the polysulfide material. Ratios above this give unsatisfactory compounds while below this range the cure is undesirably retarded. It is understood that sufficient moisture can be absorbed from the atmosphere to cure the composition over periods of time in excess of three weeks and the composition may be used in this manner to provide a one-package system where so desired.

The barium peroxide herein referred to is commercial 86% barium peroxide, the main gross impurity being barium oxide which however has a useful function in this invention as an alkaline agent. It is understood that pure $BaO_2$ or $BaO_2$ hydrates may be used, but are undesirable because of high cost and poor availability. The barium oxide has a function in the reaction, and various ratios of barium oxide are found to produce alkaline media, which promote the reaction of the barium peroxide, and the polythiol. Other oxides may also be employed and calcium oxide and magnesium oxide are representative. They react with the water present to produce calcium hydroxide, and magnesium hydroxide, which make available hydroxyl ions which produce an alkaline media which speeds the reaction rate for curing the compound. Since the reaction is promoted by alkaline media, some organic bases may be employed. It was found that the common aliphatic primary and secondary amines made the compound far too fast in setup time; however, the polyalkylene amine series as exemplified by the compound tetra ethylenepentamine promoted the reaction at a desirable rate. These amines contain both primary and secondary amine groups in their structure. The highly reactive primary amine site can be neutralized easily. The fact that these polyalkylene amines are completely water soluble is of great value because the fineness of the dispersion of the amine in a solution makes possible the more intimate contact with the surrounding media. Further advantage of the amine is made in producing an emulsifying agent that aids in the further dispersion of the water in the composition as a finely divided dispersion that might be referred to as an inverted, or water in oil, type emulsion.

Improvement in the compound can be accomplished by the addition of catalyitic metal salts, of inorganic or organic nature used commonly as paint drying agents. The cations found to be best for catalytic promotion of the reaction are the zirconyl complexes, cerium and the lanthanum series of the rare earth elements. The anion may be an organic acid, or an inorganic acid. Octoates, naphthanates and acetates are typical of use of the organic anion. Sulphates, chlorides, nitrates, are typical of the use of inorganic anions.

The preferred curing agent, barium peroxide, may be incorporated into the polythiol, in the form of finely divided solids or in the form of a suspension. The finely divided solids refers to a particle size range of from 2 to 10 microns, being the preferred range for the purpose of this invention. In the event the base mixture is to contain fillers or additives, such fillers or additives may be blended into the liquid polymer, on a suitable mill, such as a three roll mill, and the curing agent thereafter incorporated into the mixture in many suitable manner. The curing agents are preferably added to the polythiols in stoichiometric proportions, although this is not critical. In general the curing agents are added at the rate of between about 3 to about 20 parts, per 100 parts of polythiol, it being understood that less than 3 parts may undesirably retard the rate of cure, or prevent complete vulcanization, whereas, an excess for example, 20 to 75 parts per 100 parts of the polymer, may tend to impair the desirable properties, and increase the cost. A cured composition resulting from the use of polymers, with a curing agent alone may contain as high as 97% by weight of such polymers. The remarkable results obtained by the use of the method of this invention, which results can only be attributed to the more rapid reaction rate, makes it possible to produce compounds of any desired curing rate, by proper compoundings. Setup times i.e., time required for the compositon to take on rubbery characteristics of from 5 minutes to 50 hours and longer with a preferred range of 1 ot 8 hours are capable of being produced by this method.

The unique property that this curing agent possesses in producing white and pastel compounds increases the versatility of the color spectrum of the polythiol compositions by employment of appropriate pigments. In year long tests, both interior and exterior exposures, the barium peroxide cured polysulfides have shown the intrinsic property of becoming whiter, and brighter on exposure. In the white compounds this is attributed to the production of barium sulfide and/or barium oxide as part of the reaction and cure mechanism. Upon aging and further oxidation attendant therewith, the compounds became even whiter which may be attributable to bleaching by the excess of barium perixode used in the composition.

Heat tests at 212° F. for 2 weeks showed minimum increase in hardness as measured on the shore durometer A scale. Original hardnesses of 30 to 32 showed an increase to 38 to 40, indicating good heat stability under these conditions. The compound maintains the intrinsic adhesive qualities to many substrates that characterize the cure and uncured polythiol compounds, and the maintaining of such adhesion even after two weeks of water immersion at 100° F. Many salts were tested in connection with this compound, salts of an inorganic nature such as barium acetate, magnesium acetate, and sodium chloride. Both neutral salts, and salts of weak acids and moderately strong and weak bases, show a tendency to aid in the control of the reaction rate. The salts were added in both the dry form, and as five, ten, fifteen, and twenty percent solutions. It was found that the concentration of the salt could vary from five to twenty percent, and still give approximately the same results as measured by the period of time it required for the composition to cure tack free.

Adhesive additives of the epoxy resin type have been found to be fully compatible with the curing system.

As has been previously stated, the cure of the vulcanization of the preferred composition takes place at ambient temperatures. Raising the temperature accelerates the cure, but does not intrinsically improve the physical properties of the compound.

For the purpose of example, there is shown below a preferred formulation of this invention. In this formulation the composition is made in two components, the first of which is termed the base component employing the polysulfide and other agents, while the second is termed the activator component and employs the barium peroxide with other agents. It will be understood that the base and activator components can be stored in cans and the like for a long period of shelf life and, upon the need to make the cured polysulfide resin, the two may be simply mixed together and cured under ambient conditions.

EXAMPLE I

Base component: Parts by weight
Polyfunctional polysulfide (MW 4,000) _____ 100
Inert carbonates or silicates as fillers _____ 15
Pyrogenic colloidal silica _____ 5
Pigment $TiO_2$ _____ 15
Plasticizer, chlorinated biphenyl _____ 10
$H_2O$ as barium acetate solution, 20% _____ 10
Base, tetra ethylenepentamine _____ 1
Metal soap (12% metal) as a drier (cerium octoate) _____ 2
Acid, oleic _____ 1

Activator component: Pts./100 parts of polysulfide
$BaO_2$ (86%, $BaO_2$-14%, BaO) _____ 12
Epoxy resin (Epon 828) _____ 3
Phthalate ester (dioctyl phthalate) _____ 5

The polysulfides have an average molecular weight of 4000, although, as previously described, it will be understood that the molecular weight may range between 200 and 30,000. They are primarily difunctional, i.e., SH groups at the end and of a linear nature, but it will be understood that the functionality may be higher than two, and the structure could be cyclic or heterocyclic without altering the nature of the curing mechanism.

The inert materials comprising the various metallic carbonates and silicates, pigments and the pyrogenic colloidal silica can be used in a total combined range of 0 to 50% for best results, but may be as high as 100% of the weight of the polysulfides. Individually the carbonates may range from 0% to 50% as may the silicates and the pigments. The pyrogenic colloidal silica in finely divided state of less than one micron size is Cab-O-Sil and is used in a range of 0% to 10%. These inert materials are used to lower the cost and as an adjunct to the pigment. They also are employed to increase the tensile strength and provide abrasion resistance and toughness.

The plasticizer is preferably chlorinated biphenyl which may be used in a range of 0% to 15% by weight of the polysulfide resin. The chlorinated biphenyl is used in the base rather than in the activator component, because of the reactiveness of the two compounds occasioned by the presence of the chlorine in the plasticizer molecule.

The barium acetate solution is used to provide the desired amount of moisture for the reaction and to provide a buffering action. The barium acetate in the solution is desirable as a buffering agent to keep the pH of the water for all practical purposes constant. By this process and composition the pH is buffered in the range of about 7½ to 10. The barium acetate solution in this example is 20% and the range may be from 10% to 30%. Other buffering agents may be used and, very desirably, magnesium acetate is one such component. The range of this solution is 1% to 17.5% of the weight of the polysulfide corresponding to about 1 to 14% of water as such. However, the preferred amount of water, as such, in the composition is about 5% to 10% of the weight of the polysulfide. It will be understood that for the example shown 10 pts. of the 20% barium acetate solution provides 8 pts. water.

The base employed may be preferably tetra ethylenepentamine. This is preferred over other primary, secondary or tertiary amines which may also be employed, but are not quite so preferable as their action is too strong for most purposes. The oxides of calcium and barium may also be employed, as these hydrolyze to form bases in the form of calcium hydroxide and barium hydroxide. However, the particle size of the inorganic oxides is normally too high for good dispersion so the organic bases are preferred. As mentioned above, the tertiary and secondary amines are preferred over the primary because of the lesser activity of the tertiary and secondary amines in the reaction when the curing takes place.

The metal soaps are used as a drying agent with their specific function being to remove after tack. The metallic cation in the soap acts as a catalytic agent for the release of oxygen from the barium peroxide and promotes the ultimate cure of the surface with atmospheric oxygen. Zirconyl complexes of the naphthanates, octoates and hexoates may also be used. Likewise, the lanthanum series of the rare earths, including lanthanum and cerium may be employed as the cations in these organic salts. The above components have been found to be very desirable because of their drying activity and also because of their desired colored reaction products. Manganese, cobalt and molybdenum organic salts might also be used, but have undesirable color reaction products. The metallic organic salts, pointed out above, are finely dispersable in the polysulfide due to the organic anion. Besides the above metallic organic salts, the metallic cations of Group IV–B and V–B of the Periodic Table might also be used; these have to be active enough to cure the tack but, on the other hand, unreactive enough not to cure the polysulfide when stored in the polysulfide component on the shelf. In the employment of the organic ions, those that are commercially available can be employed. They must be normally a solution or liquid and cannot be too susceptible to hydrolysis. The naphthanates, hexoates and octoates have been found to be compatible in the system and are intimately dispersible therewith and are desired because of their low cost. The salts are used in a range up to 4% by weight of the polysulfide material.

The acid agent in the polysulfide base component may be used in the general range up to about 5% by weight of polysulfide to provide a pH control medium, also to serve to produce an emulsifying agent by reaction with the amine and so to aid in the dispersion of the water through the composition. The acids are organic acids and in general any weak fatty acid may be employed that may be easily dispersed. The lower chain organic acids, such as acetic or butyric acid are too strong and in general, as mentioned, the higher chain weaker fatty acids are desired, and, as an example, oleic, stearic, and palmitic acids are favorably utilized.

In the activator component barium peroxide may be used in the range of 6% to 40% of the weight of the polysulfide material. The barium peroxide may desirably be a commercial barium peroxide of about 70% to 90% $BaO_2$ with the remainder being essentially barium oxide. In the example shown, the barium peroxide is of 86% purity. The barium peroxide must be in a finely divided state to be effective and it has been found that it must pass a 325 mesh screen, and preferably in a size range of from 2–10 microns. As an example, the barium peroxide used in the example is 4 to 6 micron size.

The epoxy resin agent is used for its adhesive qualities, but, when used in the liquid state, also functions advantageously as a carrier for the barium peroxide. In general, liquid and solid epoxy resins may be employed at the intermediate and higher molecular weight range. The lower molecular weight range may be used but their reactivity presents storage problems and in most instances are too reactive for use. As an example of commercial epoxy resins that can be employed, an epoxy resin is used having a viscosity of 135–195 poises at 25° C. and an epoxide equivalent of 185–205. This resin was obtained as Epon 828 as used in Example I. In addition other epoxy resins may be used such as Araldite 6005 having a viscosity of 50–150 poises at 73° F. and an epoxide value of 175–210 and Araldite 6010 having a viscosity of 100–200 poises at 73° F. and an epoxide value of 175–210. The term epoxy resin is used to define the conventional diepoxy resin which is a reaction product of epichlorohydrin and a polyol i.e., an organic polyhydroxy compound. The typical Epon 828 molecule is as follows:

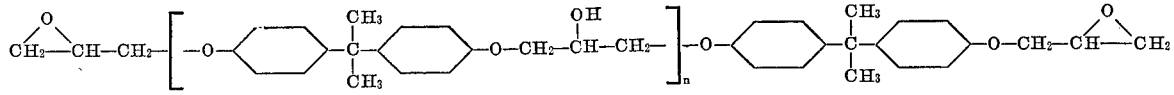

The epoxy resin can be used in the general range up to about 10% by weight of the polysulfide material, and, as previously mentioned, is desirably employed where adhesion of the cured polysulfide to the surface is desired.

The pyrogenic colloidal silica may also be used in the barium peroxide activator component, besides being employed in the base component. Where suspension of the barium peroxide in the liquid carrier components is a problem, such use is effected. In general, the use of the pyrogenic silica to prevent settling of the barium peroxide may be in the range of 1–10 pounds of the colloidal silica to 75 pounds of the barium peroxide, although more or less may be used, depending upon the problem of settling. The silica is of an amorphous nature of less than 10 microns in size and is known as Cab-O-Sil.

There are shown below, as Example II, variations from the formulation shown in Example I. Two typical formulations are shown as formulation A and B:

EXAMPLE II

|  | A | B |
|---|---|---|
| Base component, parts by weight: |  |  |
| Polysulfide | 100 | 100 |
| Chlorinated biphenyl | 15 | 10 |
| Pyrogenic silica | 6.25 | 7.5 |
| Pigment | 10 | 15 |
| Inert filler | 45.6 | 15 |
| Buffer Sol | 9.37 | 9 |
| Drier | 1.25 | 1 |
| Fatty acid | .78 | 1 |
| Alkali | .63 | 0.5 |
| Activator component, amount of component used: |  |  |
| $BaO_2$ 70–90% (86% $BaO_2$–14% BaO) 60% range 50–80% | 25.2 | 20.5 |
| Epoxy (Araldite 6005) 15% range 10–20% |  |  |
| DOP (dioctyl phthalate) 25% range 10–30% |  |  |
| Hardness test, Shore A Durometer: |  |  |
| 16 hours | 10 | 20 |
| 72 hours | 25 | 3 |

In these formulations the pigment may be of the same character as set forth in Example I. As actually used in this example, the pigment is titanium dioxide. The pyrogenic silica is of the same character as previously set forth and is Cab-O-Sil. The inert fillers were also of the character as those in Example I and in this example consisted essentially of No. 1 Whiting calcium carbonate. Likewise, the drier employed was of the same character and as here used was a 12% zirconyl naphthate. The fatty acids likewise were the same character as set forth in Example I, principally oleic acid but could be also stearic, palmitic, or tall oil fatty acid. The alkali is preferably tetra ethylpentamine, but may also be triethylamine.

The polysulfide was of the character set forth in Example I and was Thiokol LP–32. This polysulfide has the following representative formula:

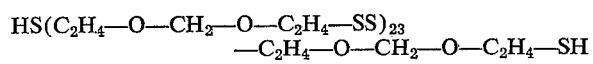

There are some side thiol groups occurring occasionally on the chain. The average molecular weight is approximately 4000.

There is set forth below in Example III six simplified formulations identified as A, B, C, D, E and F, showing formulations using polysulfide resin and barium peroxide in which the amounts of water, amine, barium oxide and cerium naphthate drier were varied.

EXAMPLE III

|  | A | B | C | D | E | F |
|---|---|---|---|---|---|---|
| Polysulfide resin | 100 | 100 | 100 | 100 | 100 | 100 |
| $BaO_2$ (86% $BaO_2$–14% BaO) | 12 | 12 | 12 | 12 | 12 | 12 |
| $H_2O$ (distilled) | 0 | 10 | 0 | 10 | 10 | 10 |
| Amine | 0 | 0 | 1 | 1 | 1 | 0 |
| BaO | 0 | 0 | 0 | 0 | 0 | 12 |
| Ce drier | 0 | 0 | 0 | 0 | 1 | 0 |
| 16 hour Shore A Hardness | (¹) | 16 | Film | 14 | 20 | 9 |
| 72 hour Shore A Hardness | (¹) | 18 | Film | 19 | 30 | 14 |
| 7 days | (¹) | 22 | Film | 23 | 34 | 19 |

¹ Uncured.

In the above formulations of Example III, formulation III–A remained uncured for a period of 21 days showing that water is essential. Formulation III–B cured, but was relatively soft as compared with Formulation III–E. Formulation III–C had a film form in 16 hours, but cure was still incomplete after 21 days, showing the necessity of using water for a rapid cure. As mentioned previously, however, such a composition with slow cure may be desirably employed as a one-package system which is air cured by the inherent moisture present. Formulation III–D cured to slightly better degree of hardness than Formulation III–B, but was not cured to the high degree of Formulation III–E. Formulation III–D was the same as Formulation III–B, but with the addition of amine as a base and alkalyzing agent. Formulation III–E cured to an effective degree of hardness and reached the optimum in 72 hours. Formulation III–F cured to some degree, but was incomplete. In the formulations the only one to show no cold flow was III–E. Formulation III–B and III–F had a minimal amount of cold flow while III–D showed a definite cold flow.

In order to determine the effect upon pot life of moisture variation in the composition of this invention, a series of tests were run. In these tests the percentage of moisture was varied and the pot life was measured. By the determination of the pot life, there is meant the period before the mixture of the base component and the activator component starts to thicken to a point where it cannot be conveniently worked. This is of importance where the mixture is used in a caulking gun where the measurable pot life is to a point where the mixture thickens to an extent that it cannot be worked through the caulking gun. There is shown in FIG. 1 a curve showing the pot life as a result of the percentage of moisture variation. This curve shows, as indicated in the region A, that there is a stable pot life from approximately 4% to 8 moisture content based on the weight of the total base component, which can be expressed in the percent of water based on the polysulfide resin per se, as about 5% to 10%. For convenience in this conversion, the corresponding moisture contents are set forth below in Table I.

Below the range of 4% to 8% moisture based on the total weight of the base component, it will be apparent from FIG. 1 that there is a drop-off in pot life, that is the pot life is relatively short and unstable and decreases as the moisture content is decreased. It is understood that at a certain point in the range of less than 1% moisture (on the total base) compounds of exceedingly long cure times results. The ranges in less than 1% (on total base) show a surface condition of uncured polysulfide which is objectionable because of excessive dust pickup, and general pickup of extraneous material due to the adhesive quality of the uncured film. This is undesirable due to the difficulty of standardization and control of the product. Short pot life also lessens the usable length of the material and is undesirable in caulking where caulking guns are employed as the material may thicken and clog the caulking gun. At moisture contents above 8% the pot life is excessive and the cured compound is softer than desirable and additionally takes longer time to cure.

inch. The tests were run after seven days' curing after which the cure was substantially complete.

Figure 2:
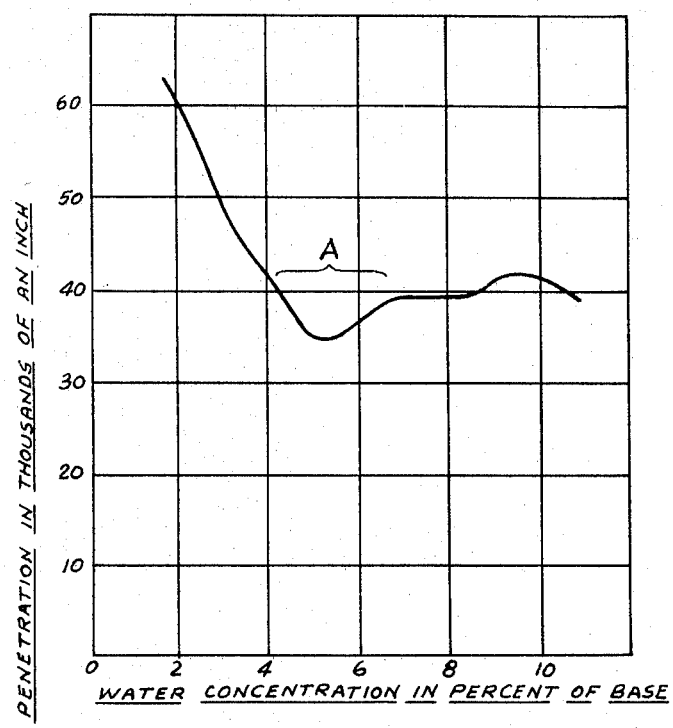

The results of these tests are shown in the curve of FIG. 2. From these tests it will be noted that the optimum hardness appears in region A of the curve of FIG. 2 at approximately 4¼% to 6½% of moisture based on the total weight of the base, while the optimum, that is the hardest point, is reached at about 5%. This range corresponds generally as will be apparent from the discussion above with respect to the curve of FIG. 1, to a range of about 5% to about 8% moisture based on the weight of the polysulfide material in the base component.

With respect to the tests of FIG. 1 relating to needle penetration, the tests were made on the cured formulation of Example I after seven days' curing. At moisture percentages of less than about 4% based on the total weight of the base, it will be apparent that there is a rapid rise in softness of the cured resin as the moisture content decreases. At moisture contents of above about 6½%, based on the weight of the total base, there is a fluctuation back and forth in the hardness and after 10%, although the curve is not shown, there is a rapid rise in the softness. From the point of about 6½% in the curve of FIG. 1 to 10% and more, there is the appearance of some voids due to bubbles in the cured compound and the product is not as desirable as the lower levels of moisture. Also, as will be apparent from the previous description, the cure is undesirably lengthened at the higher moisture concentrations.

From the formulations of the various examples above, it will be apparent that there has been provided a novel method and composition for curing polyfunctional polysulfides. The method can be advantageously employed without rigorous process controls or complicated equipment to provide a cured composition which cures in controllable rates in a desirably short period of time, or under controlled conditions for selected curing periods. As a special consequence, there has been provided a two component system utilizing the polysulfide base component and the barium peroxide activator component, which are separately stored and may be simply packed in cans or other containers until their usage is desired. Thus, they may be packed and stored in stores until a customer makes a purchase and desires to use the material and a long shelf life is one of the features of the composition. Further, mixing of two components is simple and can take place under ambient conditions of atmosphere and temperature to provide a cured polysulfide resin.

Various changes and modifications may be made in the formulations of this invention as will be apparent to those skilled in the art in the light of applicants' disclosure. Such changes and modifications in the use of components and ranges of the components are within the scope and teaching of this invention as defined by the claims appended hereto.

What is claimed is:

1. A method of curing polythiol polysulfides having

TABLE I

| | A | B | B-1 | C | C-1 | D | D-1 | E | E-1 | F | G |
|---|---|---|---|---|---|---|---|---|---|---|---|
| Percent moisture based on total base component | 1.67 | 3.18 | 4.1 | 4.8 | 5.6 | 6.4 | 7.1 | 7.8 | 8.5 | 9.2 | 10.6 |
| Percent moisture based on polysulfide | 2.12 | 4.6 | 5.19 | 6.1 | 7.1 | 8.06 | 9.0 | 9.9 | 10.8 | 11.7 | 13.5 |

In these tests the formulation of Example I was employed with the moisture percentage variation as above pointed out.

In order to demonstrate the effect of moisture variation upon hardness of the cured composition needle penetration tests were employed. In these tests the percentage of moisture was varied and the hardness was determined by a standard test using a 175-gram needle in which the penetration of the needle into the cured polysulfide composition was determined in thousandths of an thiol terminated groups and a molecular weight of about 200 to 30,000 which comprises reacting therewith a mixture of barium peroxide and barium oxide in the amount of 6% to 40% by weight of the polysulfide, said reaction being carried out in an alkaline medium with water, adding as a drier a metallic salt of an organic acid in which the metallic moiety is a member of the lanthanum series of the rare earths, and thereby curing the reaction mixture under room temperature conditions.

2. A method of curing polythiol polysulfides having thiol terminated groups and a molecular weight of about 200 to 30,000 which comprises reacting therewith a mixture of barium peroxide and barium oxide in the amount of 6% to 40% by weight of the polysulfide, said reaction being carried out in an alkaline medium with water, adding a weak easily dispersible organic fatty acid, adding as a drier a metallic salt of an organic acid and in which the metallic moiety is a member of the lanthanum series of the rare earths, adding chlorinated biphenyl as a plasticizer and said barium peroxide and barium oxide being added to the polysulfide in a liquid suspension, said suspension comprising an epoxy resin as an adhesive additive, said epoxy resin being a reaction product of epichlorohydrin and a polyol, a liquid phthalate ester plasticizer and finely divided amorphorus pyrogenic silica as a suspending agent, and thereby curing the reactant mixture under room temperature conditions.

References Cited

UNITED STATES PATENTS

| | | |
|---|---|---|
| 3,142,656 | 7/1964 | Carpenter et al. ___ 260—79.1 X |
| 2,940,958 | 6/1960 | Smith _____ 260—79.1 |
| 2,929,794 | 3/1960 | Simon et al. |
| 2,871,217 | 1/1959 | Howard _____ 260—830 X |
| 2,787,608 | 4/1957 | Gregory et al. ____ 260—830 X |
| 2,584,264 | 2/1952 | Foulks _____ 260—79.1 X |
| 2,466,963 | 4/1949 | Patrick _____ 260—79.1 |
| 2,195,380 | 3/1940 | Patrick _____ 260—79.1 X |
| 3,225,017 | 12/1965 | Siegman et al. _____ 260—79.1 |

OTHER REFERENCES

Chemicals Abstracts, vol. 52, 15111b, "Liquid Thiokols."

"Polysulfide Liquid Polymers," Jorczak and Fettes, Industrial and Engineering Chemistry, vol. 43, pp. 325–327, February 1951.

"Varnish Constituents," Chatfield, p. 564, Leonard Hill Ltd., 1953.

DONALD E. CZAJA, Primary Examiner

C. WARREN IVY, Assistant Examiner

U.S. Cl. X.R.

260—31.8, 33.8, 37, 830, 79.1